United States Patent [19]
Grell

[11] 3,834,756
[45] Sept. 10, 1974

[54] RAINCOVER FOR STROLLER WITH CANOPY

[76] Inventor: Helga U. Grell, 80-76 Cypress Ave., Ridgewood, N.Y. 11227

[22] Filed: Feb. 6, 1973

[21] Appl. No.: 330,039

[52] U.S. Cl.............................. 296/136, 296/78 A
[51] Int. Cl.............................................. B60j 9/00
[58] Field of Search ........ 296/136, 78 A; 280/47.38

[56] References Cited
UNITED STATES PATENTS

| | | | |
|---|---|---|---|
| 916,439 | 3/1909 | Grover | 296/78 A |
| 2,218,043 | 10/1940 | Lilleberg | 296/78 A |
| 2,789,863 | 4/1957 | Shimabukuro | 296/78 A |
| 3,227,484 | 1/1966 | Merclean | 296/136 |
| 3,709,553 | 1/1973 | Churchill | 296/78 A |

Primary Examiner—Robert R. Song
Attorney, Agent, or Firm—Carl Miller

[57] ABSTRACT

A protective cover for a child's stroller and which keeps the child from inclement weather and splashing from passing vehicles; the device being placable over or else be built in to the canopy of a stroller, the device including transparent curtains depending downwardly around all sides of the stroller, thus forming an umbrella-like enclosure that is open from underneath.

1 Claim, 4 Drawing Figures

RAINCOVER FOR STROLLER WITH CANOPY

This invention relates generally to strollers. More specifically it relates to waterproof canopies.

A principle object of the present invention is to provide a raincover for a child's stroller which will protect the child from inclement weather.

Another object is to provide a raincover for a stroller with canopy and which gives a protection on all sides for the child, unlike the overhead canopy so that driving rain, sleet and snow as well as wind cannot get under the canopy and at the child.

Yet another object is to provide a raincover which can be either a separate accessory attachable to a stroller or which can be incorporated into the stroller canopy structure.

Other objects are to provide a raincover for a stroller with canopy which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Figure 1:
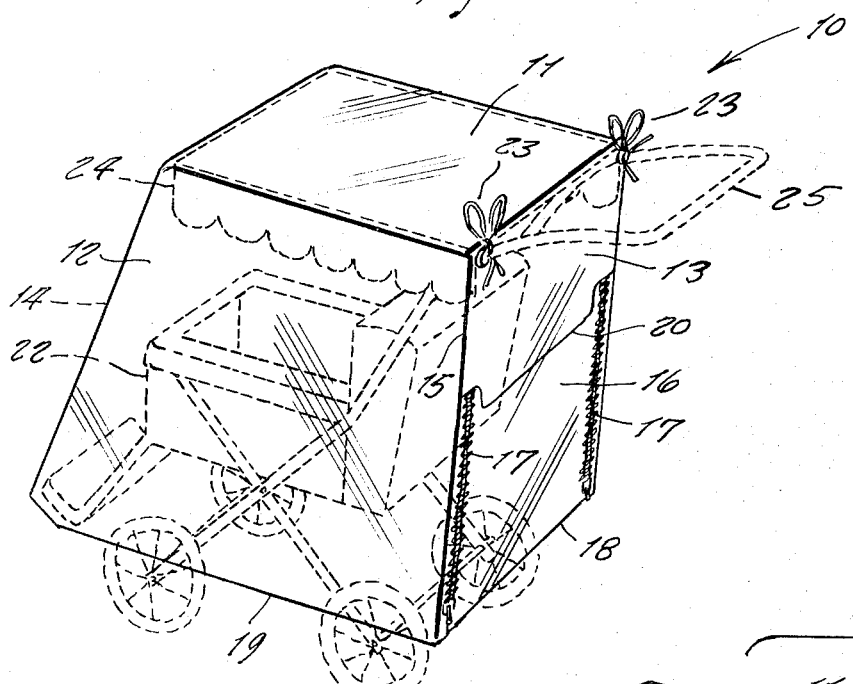
FIG. 1 is a perspective view of one design of the invention shown in use over a stroller.
Figure 2:
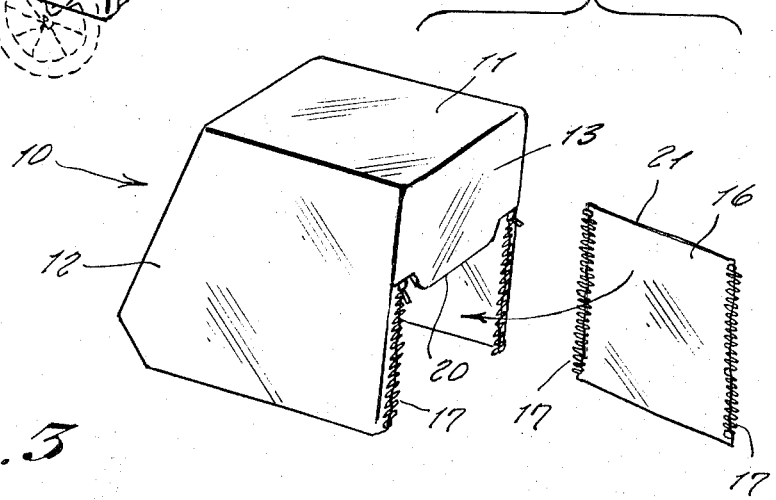
FIG. 2 is a similar view of the same model shown with rear panel removed.

Referring now to the drawings in detail, and to FIGS. 1 and 2 at this time, the reference numeral 10 represents a raincover for a stroller with canopy according to the present invention wherein there is an assembly of clear flexible plastic polyethylene panels that include a top wall 11, opposite side walls 12, rear wall 13 and front wall 14 made watertight at their edges 15 either by stitching or heat sealing.

The rear wall 13 is shorter than the others and is above a detachable rear panel 16 removably secured to the assembly by slide fasteners 17 or the like along opposite side edges. The lower edge 18 of the panel 16 is aligned with lower edges 19 of the other wall panels. An overhanging flap 20 along a lower edge of rear wall 13 extends in front of the upper edge 21 of the detachable panel 16, so to prevent rain dripping inside the raincover.

The raincover described is readily foldable or rollable so to form a compact small package for convenient storage in a stroller 22 when not in use. A pair of tapes 23 attached to the raincover serve to tie up the device in a neat small package. In operative use, it is simply draped over a canopy 24 of the stroller 22, and the tapes 23 are tied to opposite ends of the stroller handle bar 25.

Thus there is provided a raincover that can be quickly and easily attached or detached for instant use as needed.

In a modified design, the raincover 10 can be made a part of the canopy 24 by being built-in with it, and the depending walls can be rolled up or tuched in edge pockets of the canopy when not needed, but from which they can be quickly rolled or pulled down.

Figure 3:
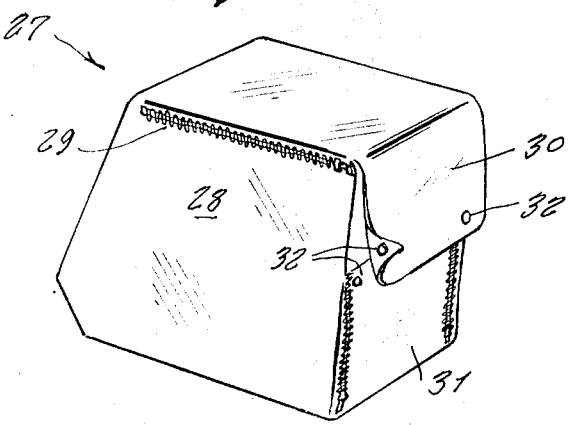
FIG. 3 is a perspective view of a modified model thereof.

In FIG. 3 a slightly modified design thereof shows a raincover 27 in which the side walls become flaps 28 by being detachable along the upper edges by a slide fastener 29. The lower edge of an upper rear flap 30 is attachable to the upper edge of lower rear flap 31 by means of snap fasteners 32.

Figure 4:
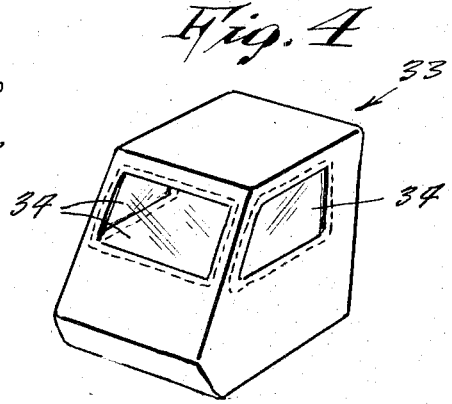
FIG. 4 shows still another model of opaque material and which includes windows in front and the sides.

In FIG. 4, a further modified design of raincover 33 can be comprised of either of the above described models wherein the material is of opaque color plastic polyethylene, so that transparent plastic windows 34 are included at the front, sides and rear of the device so that a child can see outside in all directions.

While certain novel features of this invention have been shown and described and are pointed out in the annexed claims, it will be understood that various omissions, substitutions and changes in the forms and details of the device illustrated and in its operation can be made of those skilled in the art without departing from the spirit of the invention.

What I claim as new and desire to secure by U.S. letters patent is:

1. In a raincover for a stroller having a canopy, the combination of an assembly made of transparent, flexible plastic polyethylene material, said assembly being built into said stroller canopy, said assembly including a top wall, depending front wall, opposite side walls and rear wall for enclosing a child seated in said stroller against inclement weather or splashing water or mud; said rear wall consisting of upper and lower rear flaps, said upper flap being integral with an edge of said top wall and a lower edge thereof being securable by snap fasteners to an upper edge of said lower flap, said lower flap being removably secured by slide fasteners along its opposite side edges to said walls, and an upper edge of said side walls having slide fasteners so to be selectively disengagable with side edges of said top wall.

* * * * *